United States Patent
Preble et al.

(10) Patent No.: US 9,086,584 B2
(45) Date of Patent: Jul. 21, 2015

(54) DYNAMIC WAVELENGTH CONVERTER

(75) Inventors: Stefan Preble, Pittsford, NY (US);
Michal Lipson, Ithaca, NY (US)

(73) Assignee: Cornell University, Ithaca, NY (US)

( * ) Notice: Subject to any disclaimer, the term of this patent is extended or adjusted under 35 U.S.C. 154(b) by 1588 days.

(21) Appl. No.: 12/438,716

(22) PCT Filed: Aug. 24, 2007

(86) PCT No.: PCT/US2007/018698
§ 371 (c)(1),
(2), (4) Date: Oct. 6, 2010

(87) PCT Pub. No.: WO2008/024458
PCT Pub. Date: Feb. 28, 2008

(65) Prior Publication Data
US 2011/0013266 A1    Jan. 20, 2011

Related U.S. Application Data

(60) Provisional application No. 60/839,971, filed on Aug. 24, 2006.

(51) Int. Cl.
*G02F 1/35* (2006.01)
*G02F 2/02* (2006.01)
*G02F 1/01* (2006.01)
*G02F 1/015* (2006.01)

(52) U.S. Cl.
CPC ............... *G02F 2/02* (2013.01); *G02F 1/0126* (2013.01); *G02F 2001/0156* (2013.01); *G02F 2203/15* (2013.01)

(58) Field of Classification Search
None
See application file for complete search history.

(56) References Cited

U.S. PATENT DOCUMENTS

| | | | | |
|---|---|---|---|---|
| 5,231,643 A * | 7/1993 | Naya et al. | .................. | 372/94 |
| 5,506,712 A | 4/1996 | Sasayama et al. | | |
| 6,442,311 B1 * | 8/2002 | Barbarossa et al. | ............ | 385/37 |
| 7,751,654 B2 * | 7/2010 | Lipson et al. | .................... | 385/1 |
| 7,840,099 B2 * | 11/2010 | Pan et al. | .......................... | 385/1 |
| 2001/0004411 A1 * | 6/2001 | Yariv | .............................. | 385/28 |
| 2002/0039470 A1 * | 4/2002 | Braun et al. | .................... | 385/50 |
| 2003/0123780 A1 * | 7/2003 | Fischer | .......................... | 385/15 |
| 2003/0223695 A1 * | 12/2003 | Li et al. | .......................... | 385/39 |
| 2004/0114930 A1 * | 6/2004 | Krug et al. | .................... | 398/79 |
| 2004/0146431 A1 | 7/2004 | Scherer et al. | | |
| 2005/0189591 A1 | 9/2005 | Gothoskar et al. | | |
| 2006/0023997 A1 * | 2/2006 | Almeida et al. | ................ | 385/27 |

(Continued)

FOREIGN PATENT DOCUMENTS

WO    WO-2004008209 A1    1/2004
WO    WO-2005116708 A1    12/2005

(Continued)

OTHER PUBLICATIONS

Absil et al, "Wavelegnth Conversion in GaAs micro-ring resonators", Optics Letters / vol. 25, No. 8/ Apr. 15, 2000.*

*Primary Examiner* — Hemang Sanghavi
(74) *Attorney, Agent, or Firm* — Schwegman Lundberg & Woessner, P.A.

(57) ABSTRACT

A wavelength converter includes an optical resonator that is optically coupled to a waveguide. The refractive index of the optical resonator is dynamically changed, such as by injecting free carriers into the resonator. This effectively changes that optical path length of the light, thus converting the wavelength.

18 Claims, 4 Drawing Sheets

(56) References Cited

U.S. PATENT DOCUMENTS

2007/0071386 A1* 3/2007 Digonnet et al. ............... 385/32
2008/0123701 A1* 5/2008 He ................................. 372/23

FOREIGN PATENT DOCUMENTS

| WO | WO-2008024458 A2 | 2/2008 |
| WO | WO-2008024458 A3 | 2/2008 |

* cited by examiner

DYNAMIC WAVELENGTH CONVERTER

RELATED APPLICATIONS

This application is a nationalization under 35 U.S.C. 371 of PCT/US2007/018698, filed Aug. 27, 2007 and published as WO 2008/024458 A2 on Feb. 28, 2008, which claimed priority under 35 U.S.C. 119(e) to U.S. Provisional Patent Application Ser. No. 60/839,971, filed Aug. 24, 2006; which applications and publication are incorporated herein by reference and made a part hereof.

GOVERNMENT FUNDING

This invention was made with Government support under Grant Number 0446571 awarded by NSF Career and under Grant Number DMR-0120967 awarded by NSF Science and Technologies Center. The United States Government has certain rights in the invention.

BACKGROUND

Several different methods have been used to attempt to change the wavelength of light. Four wave mixing (FWM) is a $\chi$ nonlinear process where two pump photons are converted to a signal and idler photon, leading to amplification of a signal light beam and wavelength conversion to an idler beam. The new wavelength (idler wavelength) of the light is restricted by the wavelengths of the pump and signal. Four wave mixing has been demonstrated in silica fibers and also in silicon waveguides.

The Raman Effect is a non-linear process where a vibration in the material (phonon) changes the wavelength of a signal photon to a new wavelength. The new wavelength is restricted by the material and the original signal wavelength. This has been demonstrated in silica fibers and also in silicon waveguides.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A dynamic wavelength converter is described that changes the wavelength of a light signal by dynamically changing the properties of a resonator. The converter or device works by confining the signal light in the resonator. Then the resonator is adiabatically changed, causing the wavelength (or equivalently frequency/energy) of the light confined in it to change.

In one embodiment, an optical path length of an optical resonator is changed. The optical path length may be changed by changing the refractive index of the resonator. In one embodiment, the refractive index change of a the resonator is changed by injecting free-carriers into a ring resonator. The free-carrier concentration change causes the refractive index of the silicon to reduce. There are multiple ways of providing free-carrier injection. Optical pumping is used in one embodiment. In a further embodiment, carriers are electrically injected using a PIN diode or a MOS device, thus changing the optical path length of the a resonator. A change in the properties of the resonator in one embodiment occur in a time much shorter than the photon lifetime of the resonator.

Even though the free-carrier plasma dispersion effect is quite weak, it may be exploited by using a resonator to dramatically increase the sensitivity of the effect. Light confined in a resonator circulates moves continuously within the resonator. When the refractive index in the resonator has been changed by a small amount, the light will accumulate more and more of a phase change as it moves.

Figure 1:
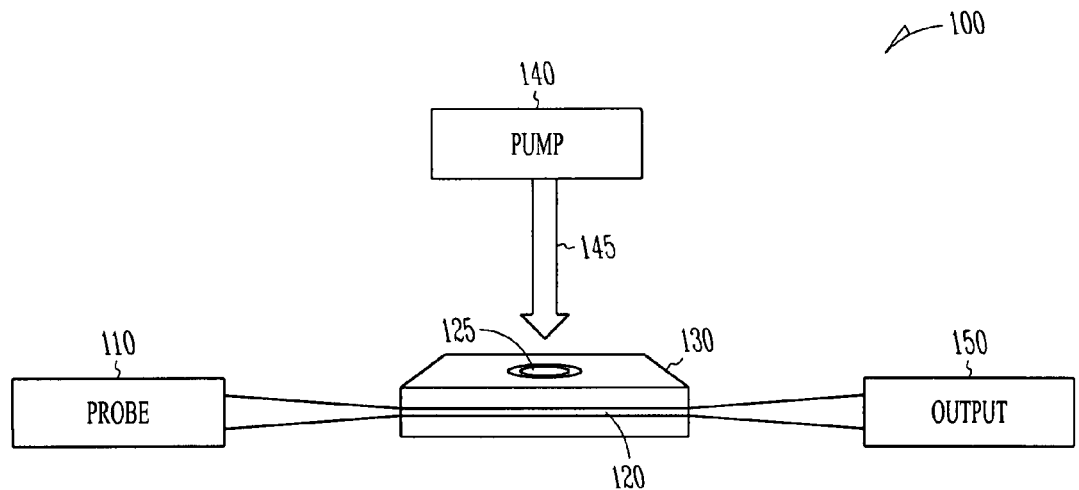
FIG. 1 is a simplified block schematic diagram of an all optical wavelength converter according to an example embodiment.

FIG. 1 is a simplified block diagram of a wavelength converter generally at 100. The converter 100 may be fabricated using standard electron-beam lithography processes. In one embodiment, a probe source 110 provides light via an optical path, such as an optical fiber 115 to a waveguide 120 that is optically coupled to a resonator 125. The resonator in one embodiment is a ring of silicon formed on an insulated substrate 130. The resonator 125 may be another type of resonator such as a distributed Bragg resonator in further embodiments.

The probe 110 light may be provided by an external laser source and coupled from a fiber onto the chip using a nanotaper 135 or other light coupling device, such as for example various lens type arrangements. In further embodiments, the probe may be from an on-chip source. The light travels through the waveguide 130 and is optically coupled to the resonator 125. The probe can be either pulsed or continuous wave. Many types of resonators may be used, such as disc resonators, photonic crystal resonators, etc.

A pump 140, such as a laser, provides pump light 145 that is directed toward resonator 125. The resonator 125 has an optical path length that changes due to the pump light 145, which causes a change in the wavelength of the probe signal that is confined and circulating within the resonator 125. The light with changed wavelength then is transmitted via waveguide 130 to an output 150. The output may be a further optical device, such as a spectrum analyzer or optical fiber for further transmission. In further embodiments, a separate output waveguide may be optically coupled to resonator 125 to provide an output. The converter 100 can be used in wavelength division multiplexing (WDM) systems to change the channel that a signal resides on.

In one embodiment, the refractive index of the resonator 125 is changed while an entire probe signal or pulse is circulating in the resonator 125. In one embodiment, the wavelength of light confined within the resonator 125 is reduced by 5 nm with a 0.01 change in refractive index. In one embodiment, the pump pulses are generated for 100 fs at a 415 nm wavelength to induce the refractive index change. Resonator 125 has a Q of 23000 in one embodiment with a photon lifetime of approximately 19 ps. Many different resonators with much higher or lower Q may be used in further embodiments. Unlike non-linear wavelength conversion, any wavelength can be generated by just changing the refractive index of the resonator.

In one embodiment, the amount of wavelength change may be altered by changing the pump power. While all of the light appears to be converted in wavelength, some may be absorbed and scattered prior to measurement of the output. A decrease in efficiency as the pump power is increased may be due to free-carrier absorption. In one embodiment, a 2.5 nm wavelength shift may be obtained and appeared to be limited by free-carrier absorption. Free-carrier absorption may be counteracted with gain or by extracting carriers with a PIN diode. In a further embodiment, several devices may be cascaded together to provide a very broad range of wavelength shift.

Figure 2A:
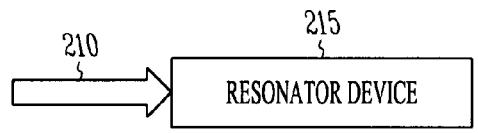
FIGS. 2A, 2B and 2C are schematic diagrams illustrating a process for changing the wavelength of light according to an example embodiment.
Figure 2B:
Figure 2C:
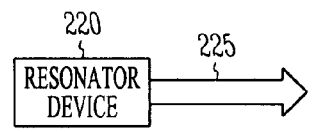

Unlike non-linear effects like FWM and Raman, the process may be substantially linear. It is based on the adiabatic dynamic tuning of a resonator as illustrated in FIGS. 2A, 2B and 2C, which are schematic representations of the converter 100. In FIG. 2A, probe light 210 is coupled into a resonator device 215. In FIG. 2B, the optical path length of the device changes adiabatically, as illustrated by a shorter appearing resonator device 220. The path length change is accomplished by changing the refractive index of the resonator in one embodiment. Converted light leaves the device at 225 in FIG. 2C. The wavelength of the light may be determined by the degree of the resonator tuning. It is not restricted by the original wavelength of the light (i.e. no phase matching criteria must be met as is the case with non-linear phenomena).

Figure 3:
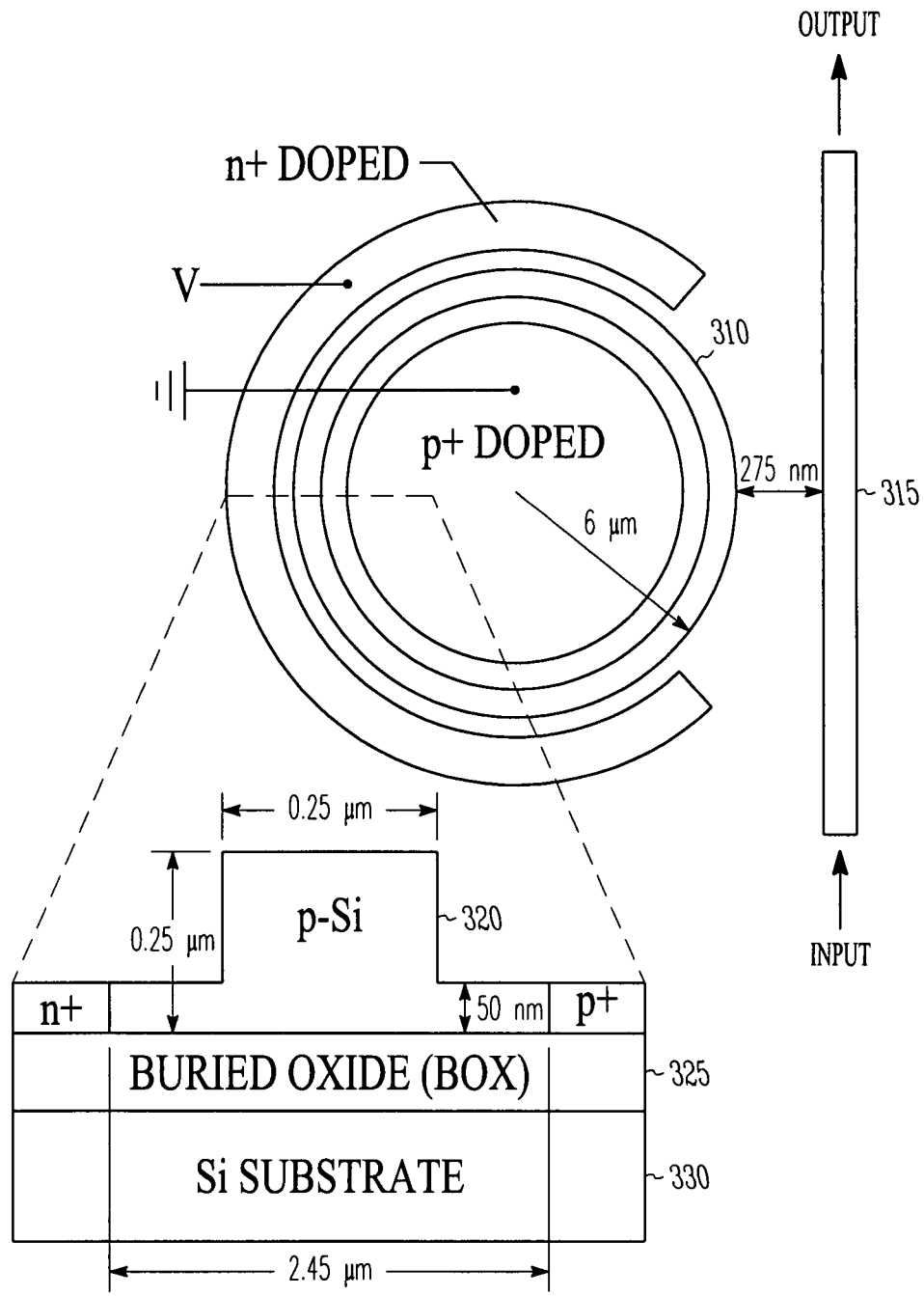
FIG. 3 illustrates an electro optic ring resonator wavelength converter according to an example embodiment.

The resonator tuning may be achieved using a dynamic refractive index change in a time much shorter than the photon lifetime of the cavity. The refractive index change may be induced in Silicon using the free-carrier plasma dispersion effect where the induced carrier concentration determines the change in refractive index. The free-carrier concentration can be changed by electrical injection using a PIN diode or MOS device as illustrated at 300 in FIG. 3, or induced by linear optical absorption, or even mechanically in further embodiments, such as by piezoelectric strain devices.

Device 300 includes a ring resonator 310 that is optically coupled to a waveguide 315 that provides both input and output of light. Multiple waveguides may be used in further embodiments. In one embodiment, resonator 310 comprises a p doped silicon ring as illustrated in cross section 320, that is formed on a buried oxide 325 supported by a substrate 330, which may also be silicon. In one embodiment, the ring resonator 310 has a diameter of approximately 6 µm. The inside of the ring includes a p+ doped region 335 with an electrical contact 340. An n+ doped region 345 is formed at least partially around the outside of the ring resonator 310. In one embodiment, the n+ doped region 345 is interrupted by the waveguide 315. An electrical contact 350 is coupled to the n+ doped region 345, and a voltage may be applied across contacts 350 and 340 to inject carriers and change the index of refraction of the ring resonator 310, along with the optical path length.

In further embodiments, a free-carrier plasma dispersion effect may be induced using two-photon absorption. When the free-carrier concentration change is induced electrically one beam of light may be used, i.e. the beam that is having its wavelength changed. With FWM more than one beam of light is used.

Non-linear processes utilize very long waveguides, measured in centimeter. The resonators used in the present embodiments may be several microns in size, enabling integration with semiconductor circuitry on semiconductor chips.

Figure 4:
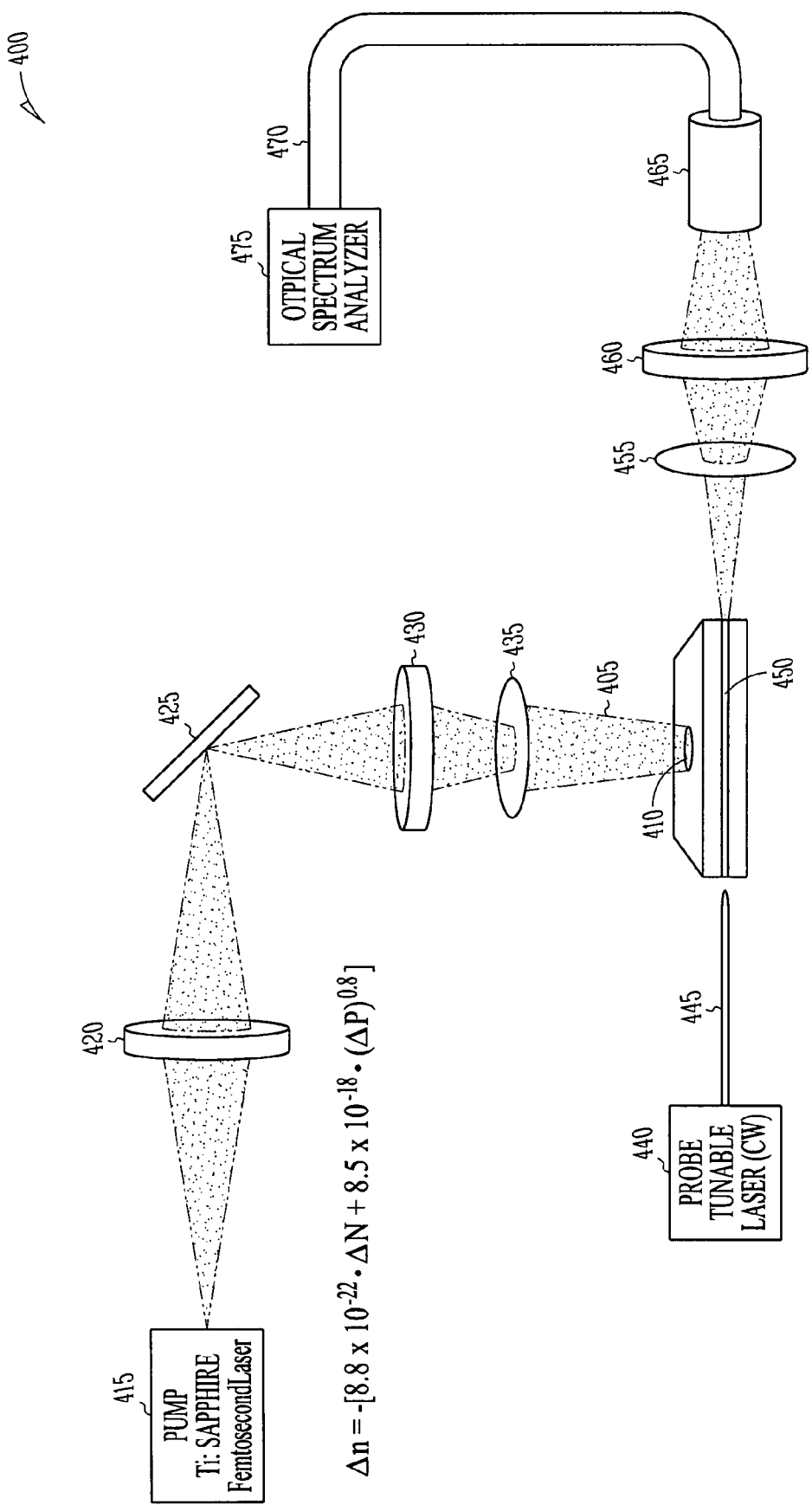
FIG. 4 is a detailed block schematic diagram of an all optical wavelength converter according to an example embodiment.

A detailed block schematic diagram of an experimental setup is illustrated at 400 in FIG. 4. An electro-optic effect (free-carrier plasma dispersion effect) illustrated by light 405 is to change the wavelength of light in a ring resonator 410 Ring resonator 410 in one embodiment is approximately 10 µm in diameter. Low power may be used in one embodiment, such as less than a third of what is needed for FWM.

A Ti:Sapphire laser 415 may be used as a pump at a wavelength of 830 nm with 100 fs pulses. A BBO (Beta Barium Borate) crystal 420 may be used to generate a second harmonic at 415 nm. This light (at 415 nm) is then focused onto the top of the ring resonator via a mirror 425, ND filter 430 and lens 435. This light is linearly absorbed by the silicon resonator 410, which causes free-carriers to be generated and in turn causes the refractive index of the silicon to reduce within 100 fs. The amount of refractive index change is determined by the pump power. The refractive index change is on the order of $10^{-3}$.

A second laser 440 may be used to provide a probe light signal via an nano-tapered optical fiber 445 to a waveguide 450 that is optically coupled to resonator 410. The probe light wavelength, approximately 1520 nm in one embodiment, is selected to allow it to be captured within the ring resonator 410 and circulate therein. In one embodiment, the probe light signal has a frequency that matches the resonant frequency of the ring resonator. Once a desired amount of light is captured and circulating within the ring resonator, the change in optical path length is induced within a period that may be significantly shorter than a photon lifetime.

As the refractive index of the ring resonator 410 changes over 100 fs, the probe light circulating in the ring resonator changes its wavelength due to adiabatic tuning of the ring resonator. This light then leaks out of the resonator exponentially (determined by the photon lifetime of the resonator which is directly proportional to the Q—typically on the order of 10's of picoseconds) into the input waveguide 450 (or alternatively also into a drop port waveguide when the ring resonator is in an add/drop configuration).

The light at the output of the chip (also coupled out using a nanotaper in one embodiment) is collected using a lens 455, polarizer 460, and collimator 465 to couple the light into a fiber 470. The light may be detected using an Optical Spectrum Analyzer 475. In further embodiments, the light may be provided to further optical devices as a signal in a logic circuit, communications line, or any other desired use.

From a single source at a single wavelength a broad range of wavelengths may be generated. The wavelength of the light is not restricted and is only determined by the degree of cavity tuning (or refractive index change in our case). With non-linear effects the materials and/or the original wavelengths of the light predetermine the wavelength of the converted light. Devices designed in accordance with setup 400 may be much more robust such devices may be dynamically reconfigured such that one pulse of light could be given one wavelength and then the next pulse of light could have a completely different wavelength. If the change were induced electrically this could be achieved simply by changing electrical current.

A refractive index change is induced by linear optical absorption of a pump to dynamically change the resonator. The change could also occur by electrical injection of free-carriers or two-photon absorption of a pump. Any other method that dynamically changes a resonator could also be used, such as strain.

Figure 5:
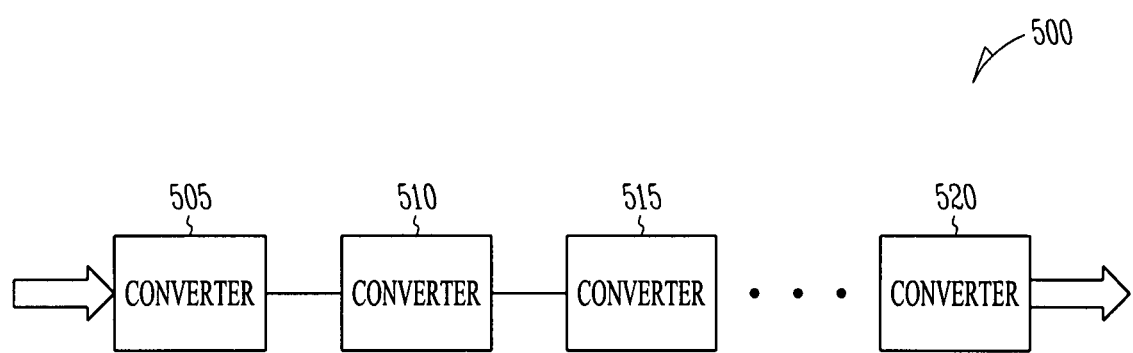
FIG. 5 is a block diagram illustrating the use of multiple wavelength converters to obtain larger wavelength shifts according to an example embodiment.

In one embodiment, wavelength converters described herein may be in a system 500 as illustrated in FIG. 5. Multiple converters 505, 510, 515, . . . 520 may be used to each provide an approximately 1-2 nm wavelength change. By cascading several of the devices together large wavelength changes may be obtained. In one embodiment, the converters may vary in radius and resonant frequency to significantly incrementally change the frequency of input light pulses.

The wavelength converters 500 may be used in a Wavelength Division Multiplexing (WDM) system to change a light signals channel. Taps may be provided from each converter to obtain desired amounts of wavelength shift, or separate sets of converters may be used for each channel. It may also be used to generate different wavelengths of light on a chip in an integrated photonic system.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A wavelength converter comprising:
   an optical resonator;
   a probe input coupled to the optical resonator to provide a probe signal to resonate in the optical resonator; and
   means for dynamically changing an optical path length of the optical resonator to change the wavelength of the probe signal resonating in the optical resonator, wherein the optical path length is changed by changing the refractive index of the optical resonator.

2. The wavelength converter of claim 1 wherein the optical resonator comprises a silicon ring resonator.

3. The wavelength converter of claim 1 wherein the means for dynamically changing the optical path length of the optical resonator injects free carriers into the resonator.

4. The wavelength converter of claim 3 wherein the carriers are injected with optical pumping orthogonal to the optical resonator.

5. The wavelength converter of claim 3 wherein the carriers are injected electrically.

6. A wavelength converter comprising:
   an optical ring resonator;
   a waveguide optically coupled to the optical resonator to provide light circulating in the optical ring resonator; and
   oppositely doped regions inside and outside the optical ring resonator coupleable to an electrical signal to dynamically change the refractive index of the optical ring resonator and to change the wavelength of the light already circulating within the optical resonator.

7. The wavelength converter of claim 6 and wherein the waveguide provides a probe light signal at approximately the resonant frequency of the optical ring resonator.

8. The wavelength converter of claim 7 wherein the waveguide receives a wavelength converted optical output signal from the optical ring resonator.

9. The wavelength converter of claim 6 wherein the ring resonator comprises a ring of silicon.

10. The wavelength converter of claim 9 wherein the ring of silicon is supported on a buried oxides layer that is supported by a silicon substrate.

11. The wavelength converter of claim 6 wherein the optical ring has a diameter of between approximately 6 and 10 µm.

12. A system comprising:
    multiple cascaded optical resonators coupled to each other, each resonator having an input to receive light to resonate in the resonators; and
    means for dynamically changing optical path lengths of the optical resonators to incrementally change the wavelength of the light already resonating within the optical resonators.

13. The system of claim 12 wherein the optical resonators comprises silicon ring resonators.

14. The system of claim 12 wherein the means for dynamically changing the optical path length of the optical resonators injects free carriers into the resonator via optical pumping or electrically.

15. The system of claim 12 wherein the optical path length is changed by changing the refractive index of the optical resonators.

16. A method comprising:
    capturing probe light in an optical resonator at the resonant frequency of the optical resonator;
    changing the optical path length of the optical resonator while the probe light is captured within the optical resonator, wherein the optical path length of the optical resonator is changed in a time frame significantly less than the photon life of the probe light; and
    outputting light from the optical resonator that has a wavelength different than that of the probe light.

17. The method of claim 16 wherein the optical path length is changed by injecting free carriers into the resonator.

18. The method of claim 17 wherein the carriers are injected electrically or with optical pumping.

\* \* \* \* \*